Jan. 16, 1923.

O. S. LEE.
DIE MILLING MACHINE.
FILED JULY 19, 1920.

1,442,483

12 SHEETS-SHEET 1

Inventor:
Ottar S. Lee
by Dyrenforth, Lee, Chritton & Wiles
Attys.

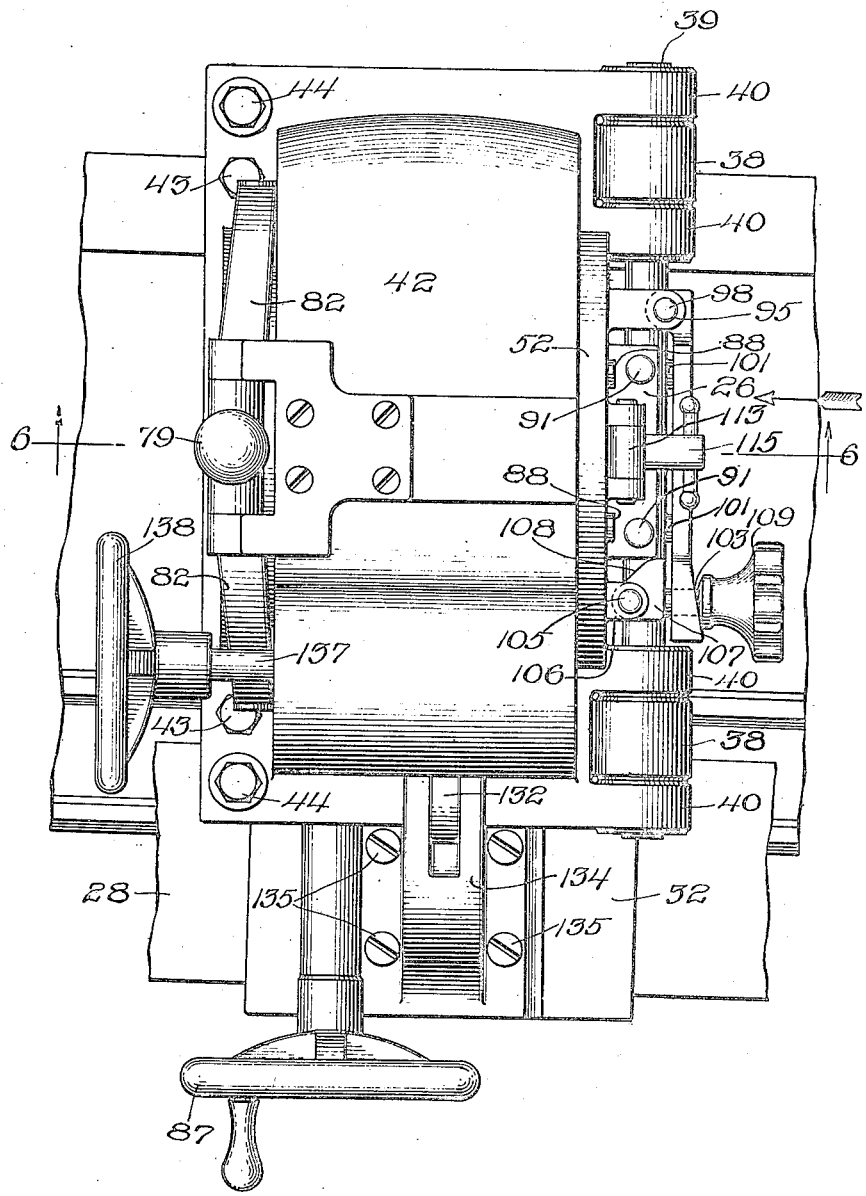

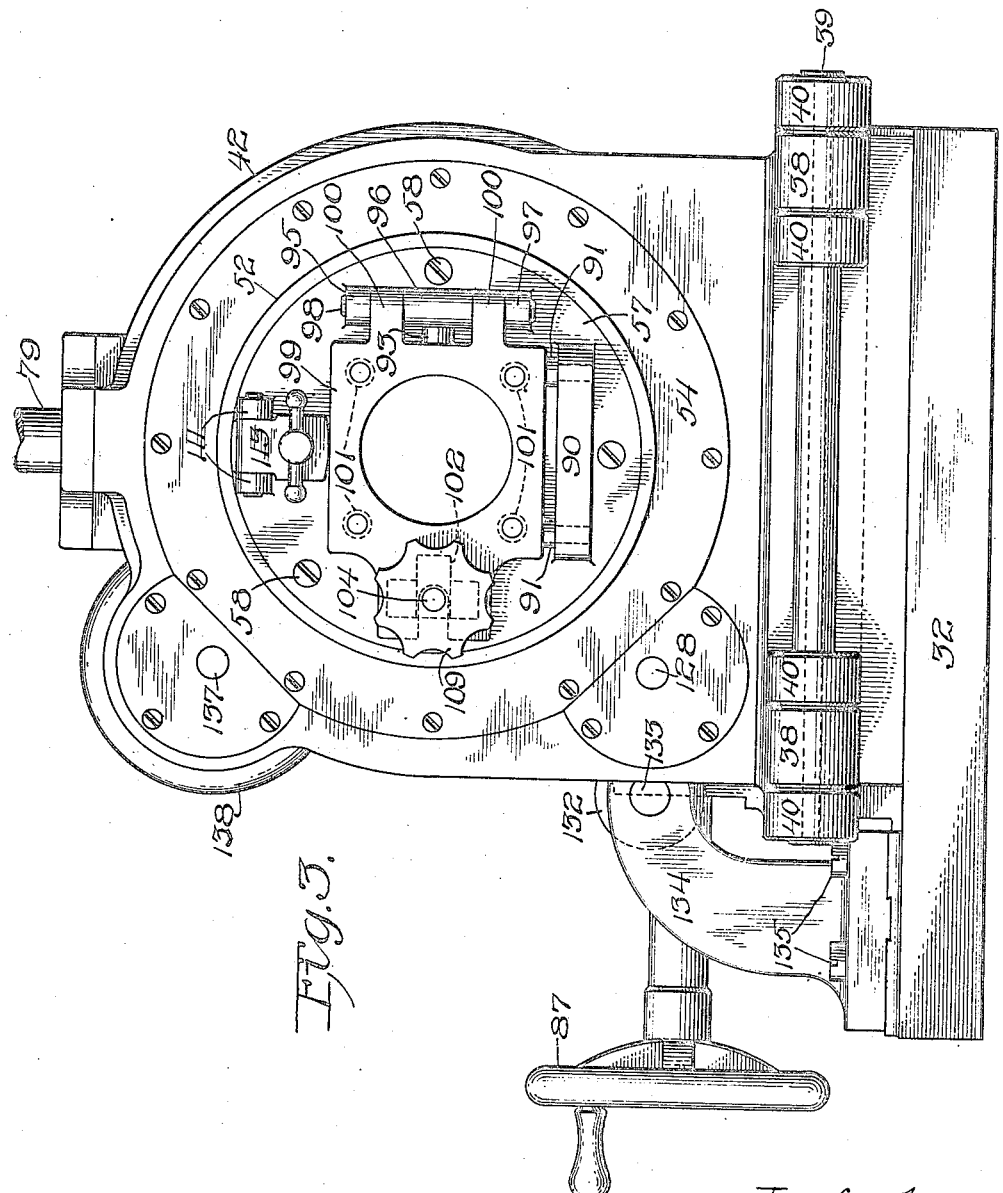

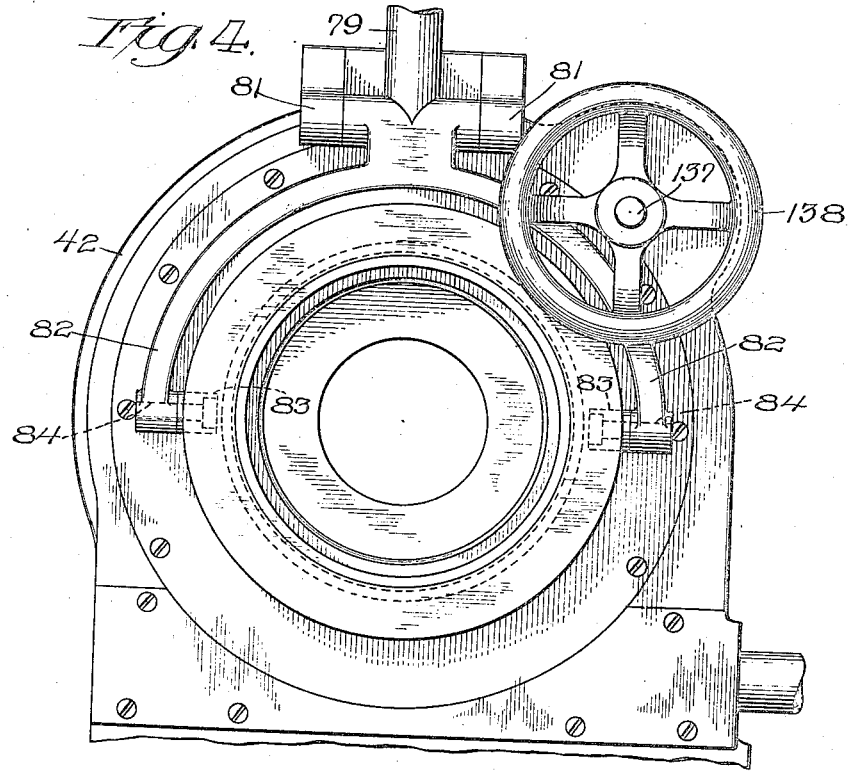
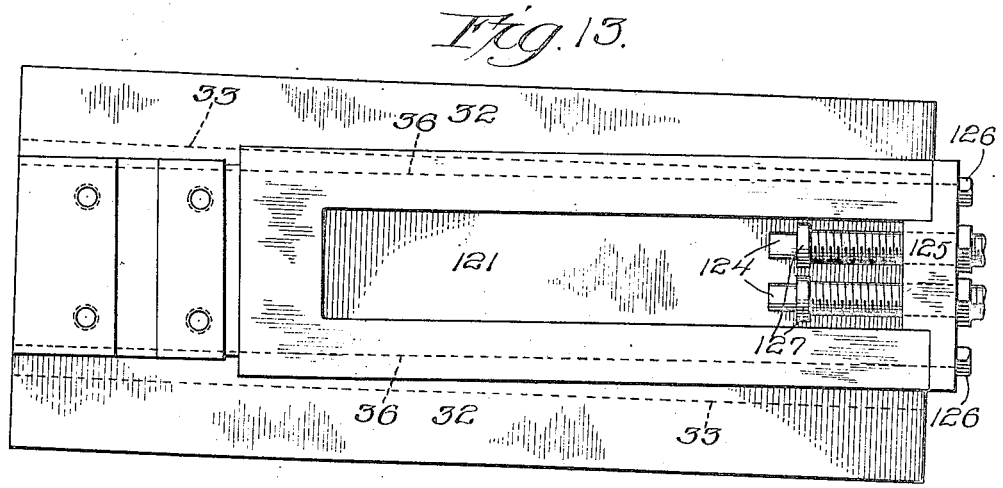

Jan. 16, 1923.

O. S. LEE.
Die Milling Machine.
Filed July 19, 1920.

1,442,483

12 SHEETS-SHEET 5

Inventor:
Ottar S. Lee.

Jan. 16, 1923.

O. S. LEE.
DIE MILLING MACHINE.
FILED JULY 19, 1920.

1,442,483

12 SHEETS-SHEET 6

Inventor:
Ottar S. Lee

Jan. 16, 1923.

O. S. LEE.
DIE MILLING MACHINE.
FILED JULY 19, 1920.

1,442,483

12 SHEETS-SHEET 9

Inventor:
Ottar S. Lee.

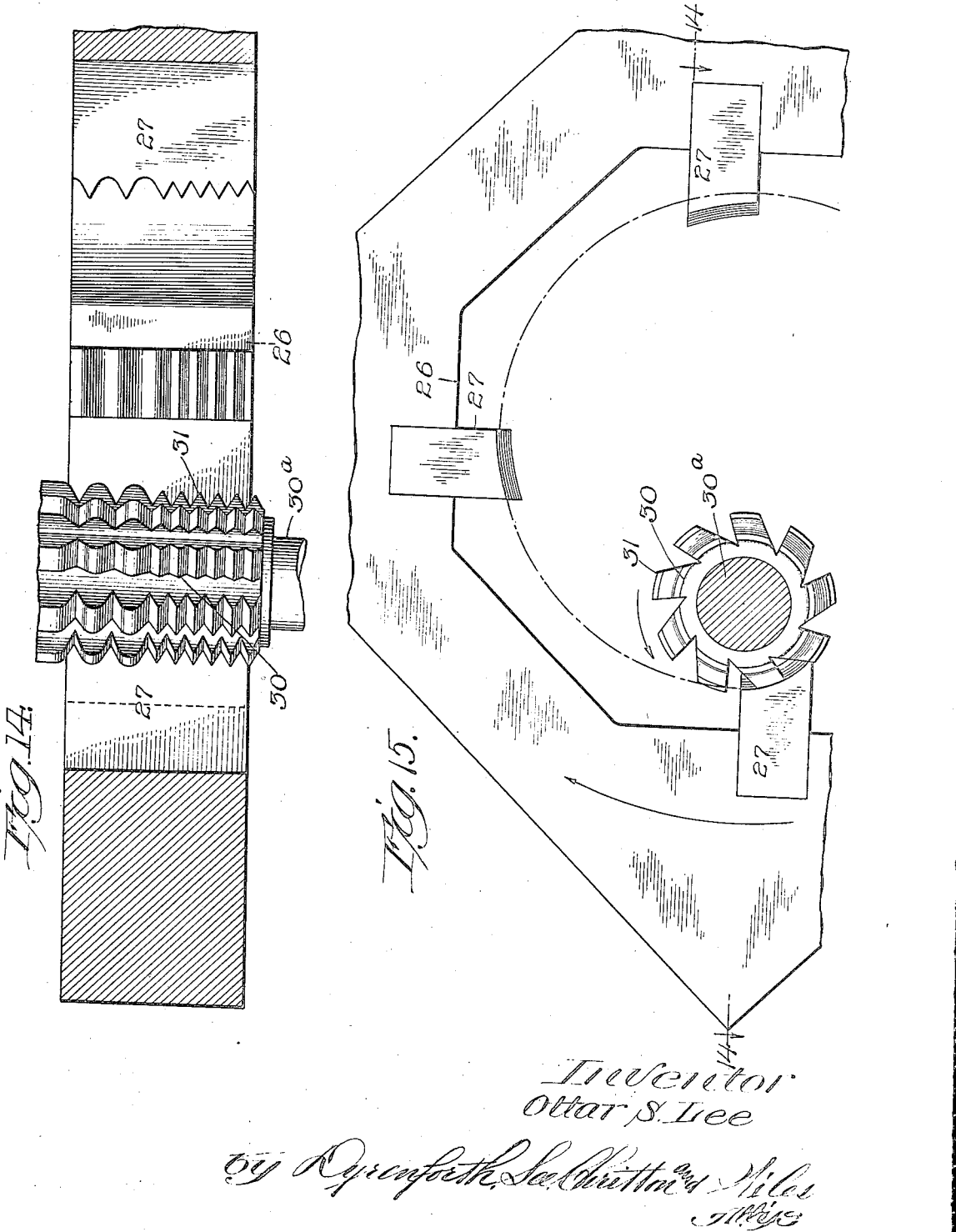

Jan. 16, 1923.
O. S. LEE.
DIE MILLING MACHINE.
FILED JULY 19, 1920.
1,442,483
12 SHEETS-SHEET 11
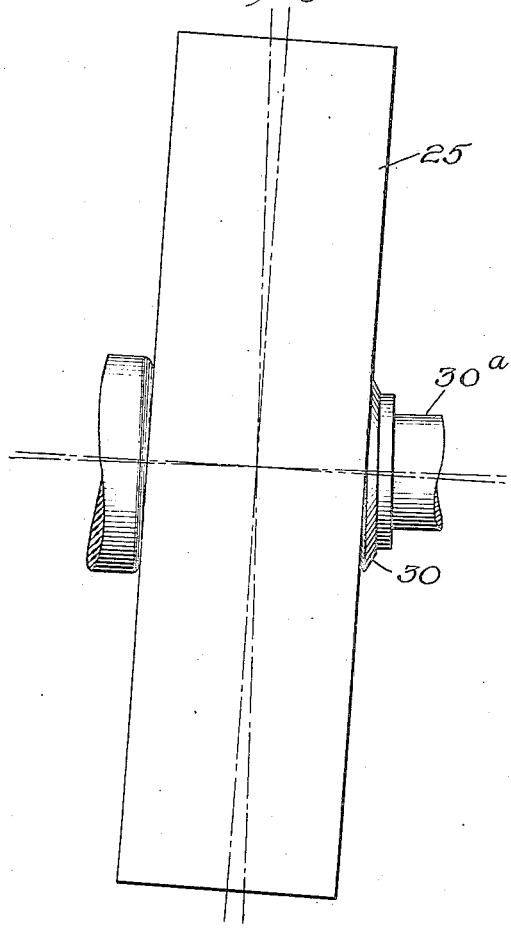
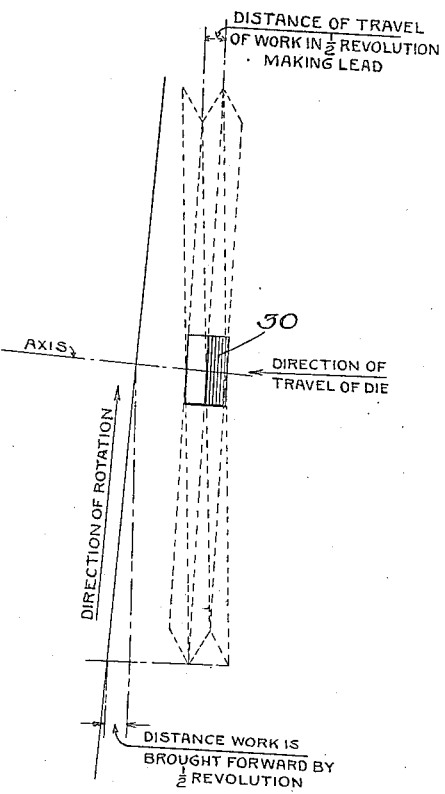
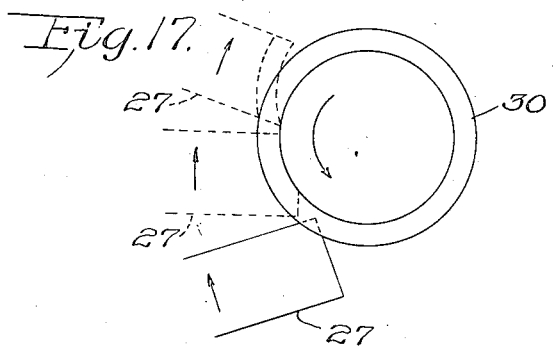
Inventor:
Ottar S. Lee

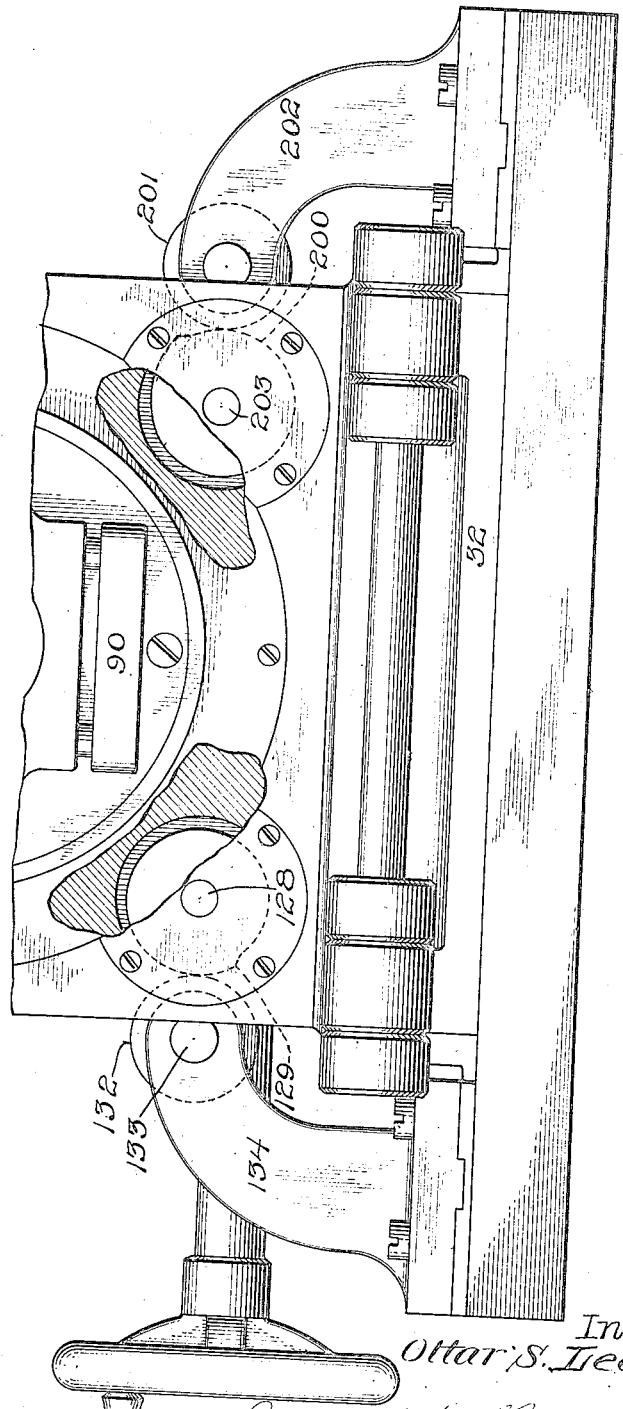

Patented Jan. 16, 1923.

1,442,483

UNITED STATES PATENT OFFICE.

OTTAR S. LEE, OF CHICAGO, ILLINOIS, ASSIGNOR TO NYE TOOL AND MACHINE WORKS, OF CHICAGO, ILLINOIS, A CORPORATION OF ILLINOIS.

DIE-MILLING MACHINE.

Application filed July 19, 1920. Serial No. 397,458.

*To all whom it may concern:*

Be it known that I, OTTAR S. LEE, a citizen of the United States, residing at 108 N. Jefferson St., Chicago, in the county of Cook and State of Illinois, have invented a new and useful Improvement in Die-Milling Machines, of which the following is a specification.

My invention relates, more particularly, to the cutting of threads on dies; and my primary object, generally stated, is to provide improvements in machines for this purpose, whereby they will operate more satisfactorily to perform the functions for which they are provided, and to produce practically perfect dies.

Specifically stated, certain of my objects are to provide a machine for operating on die blanks presenting a plurality of surfaces to be threaded and the threads of which are to be "backed-off," or relieved, which shall operate automatically to produce the desired threads in "backed-off," or relieved, condition on the several surfaces to be threaded; to provide by the use of a straight milling device, viz., one of non-tapered form, for the manufacture of dies, preferably of the tapered form, with the segments of the thread lying within a true circle and with the threads accurately formed and of sharp outline; and to provide such dies preferably with "backed-off" portions; to provide improved means for holding the die blank to be operated on, which may be quickly and easily operated to properly position in the holder, and rigidly clamp therein, the die to be operated on; and to provide improved details of construction whereby the machine is rendered of comparatively simple construction, positive in operation and capable of producing satisfactory dies.

Referring to the accompanying drawings:—

Figure 1:
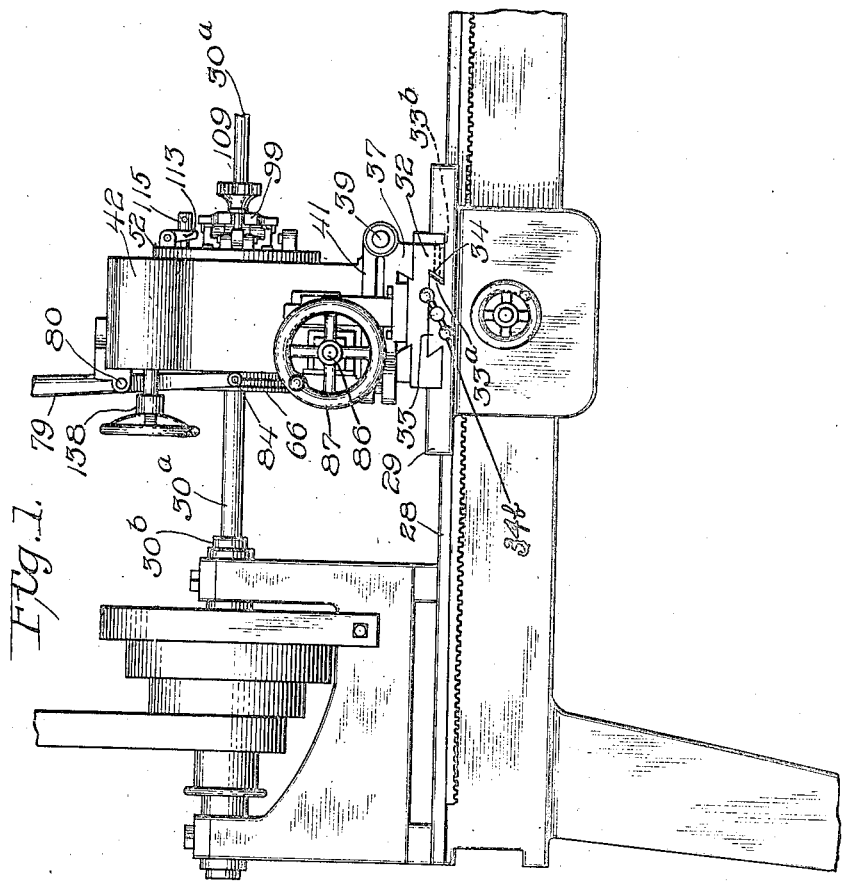
Figure 7:
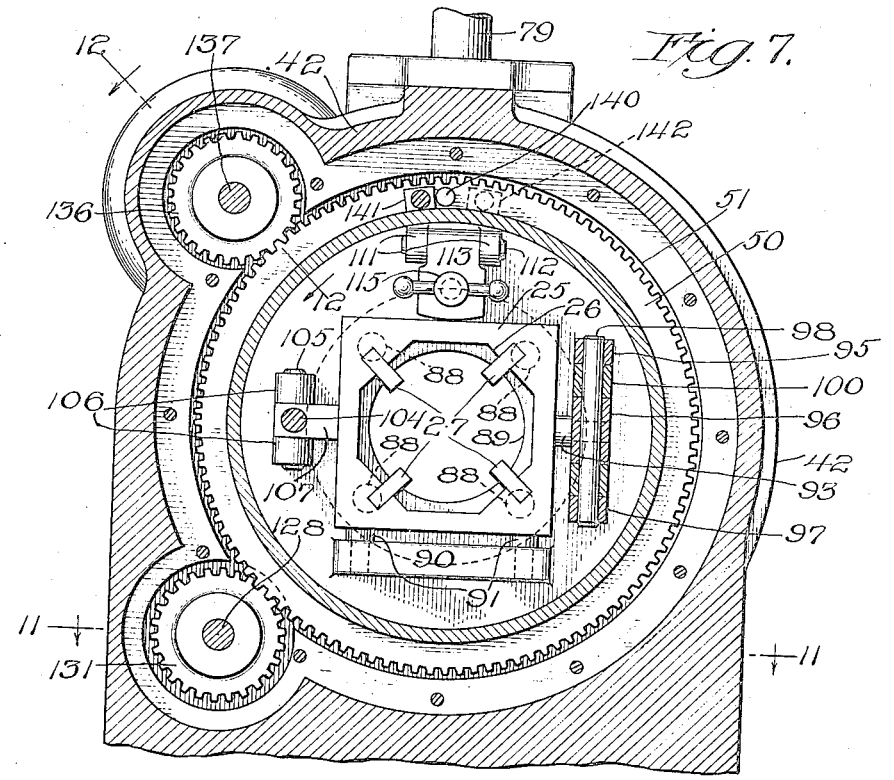
Figure 8:
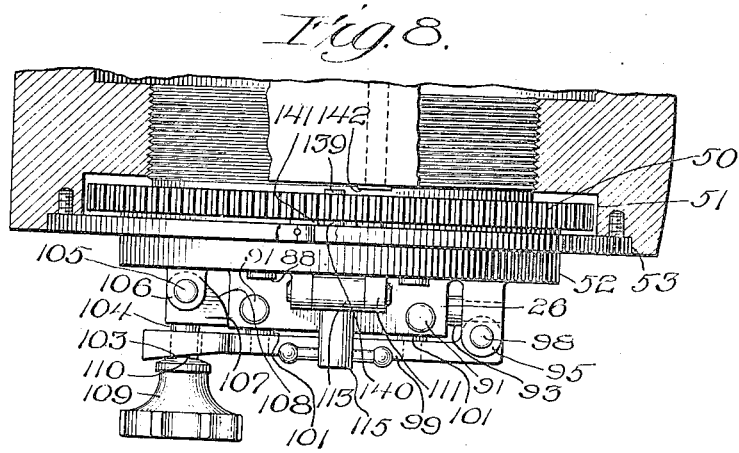
Figure 9:
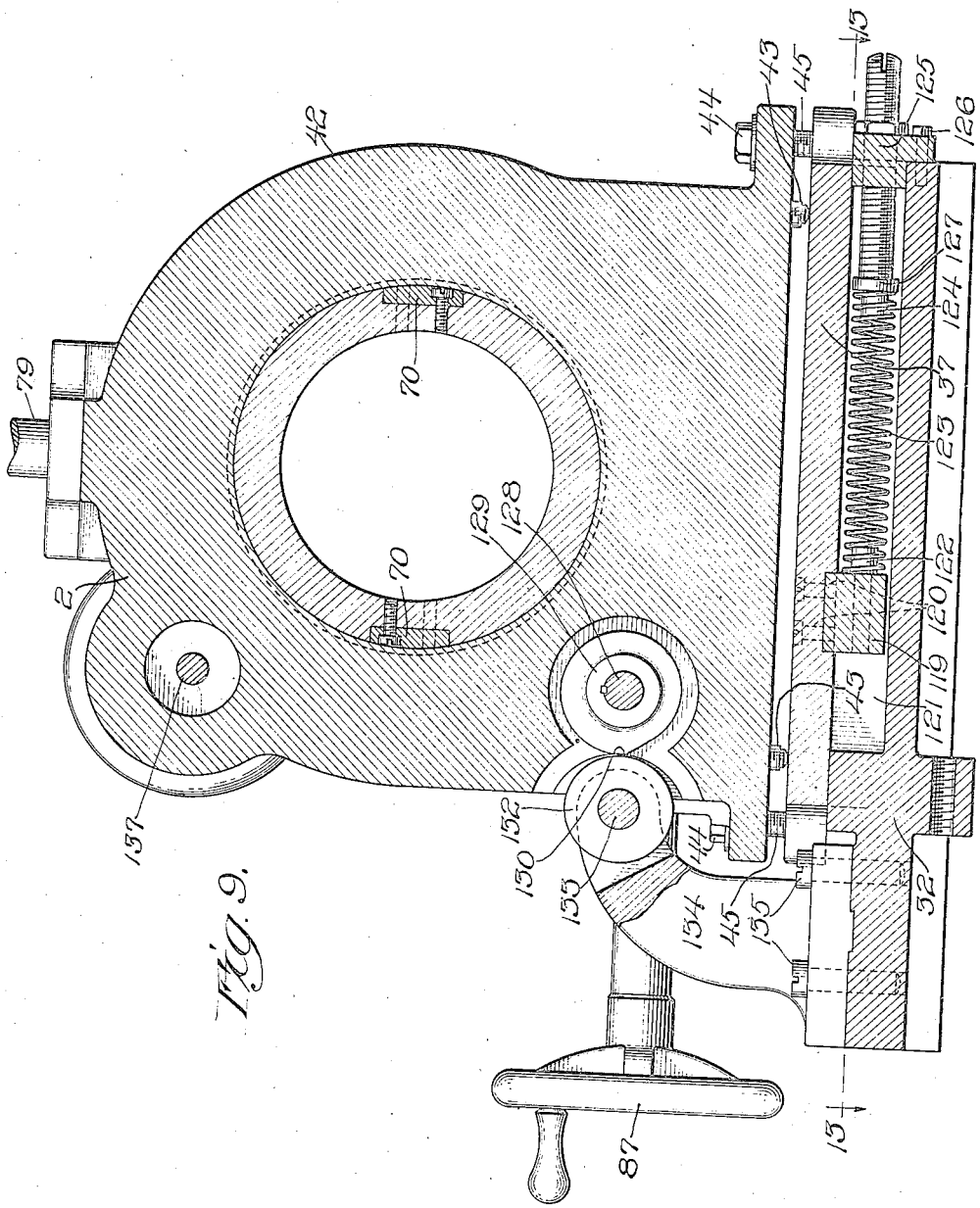
Figure 10:
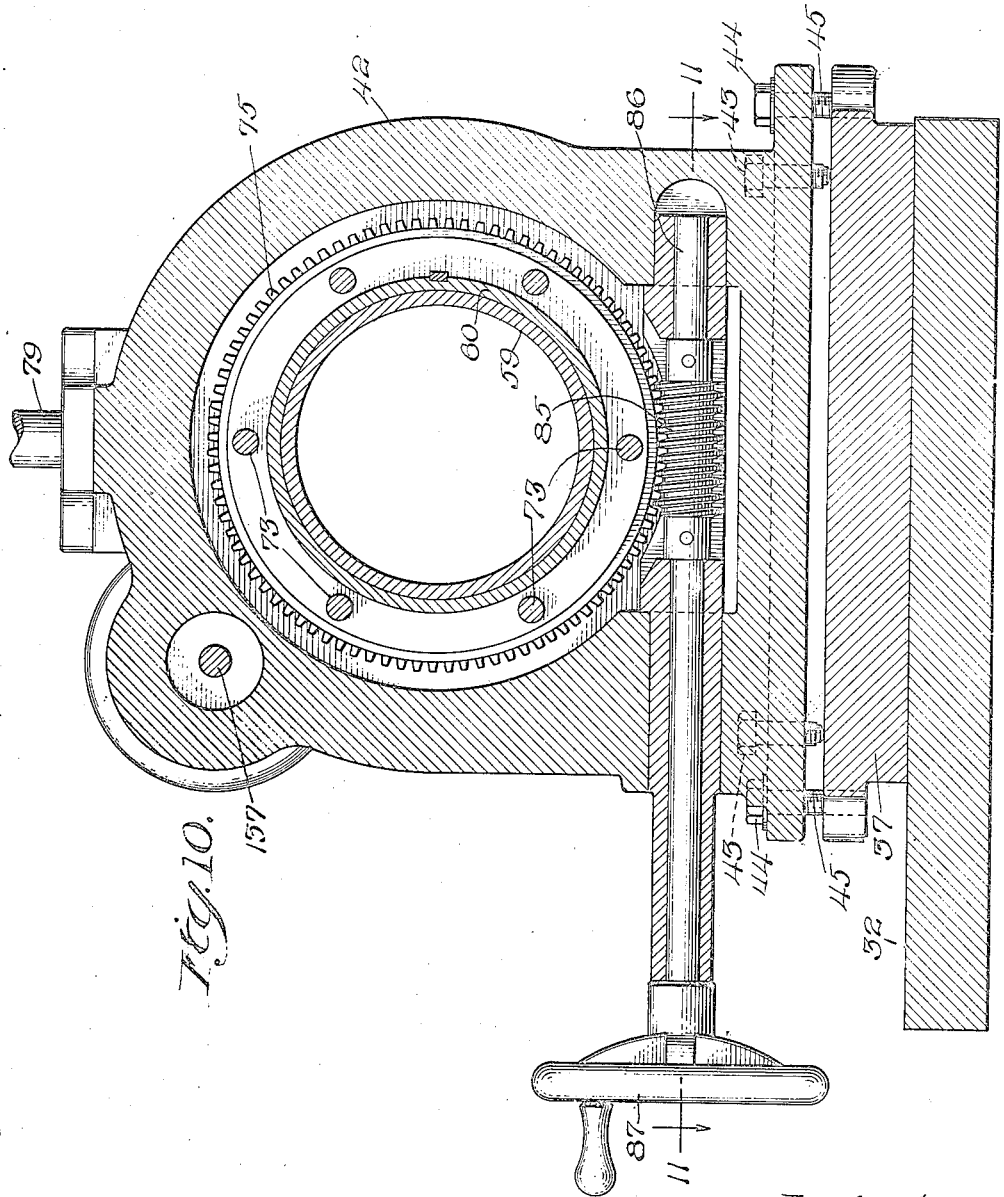
Figure 11:
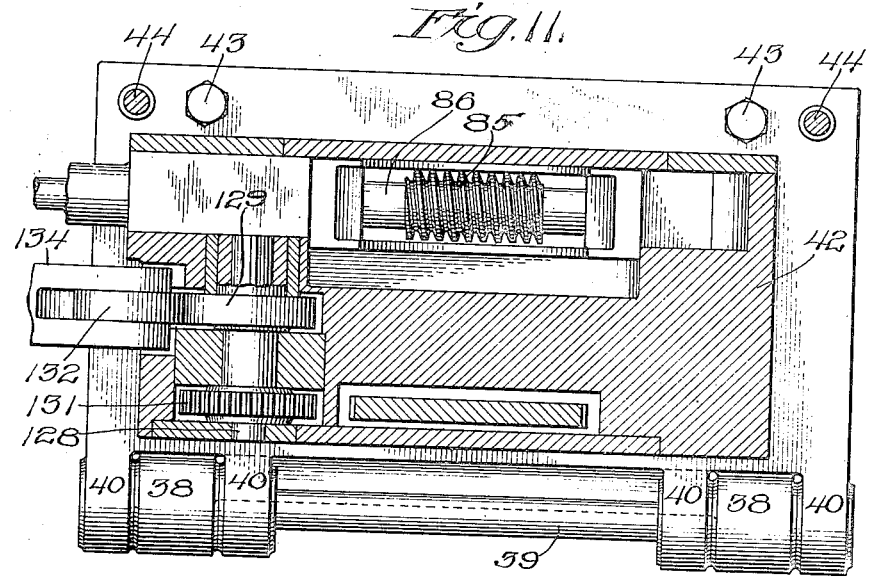
Figure 12:
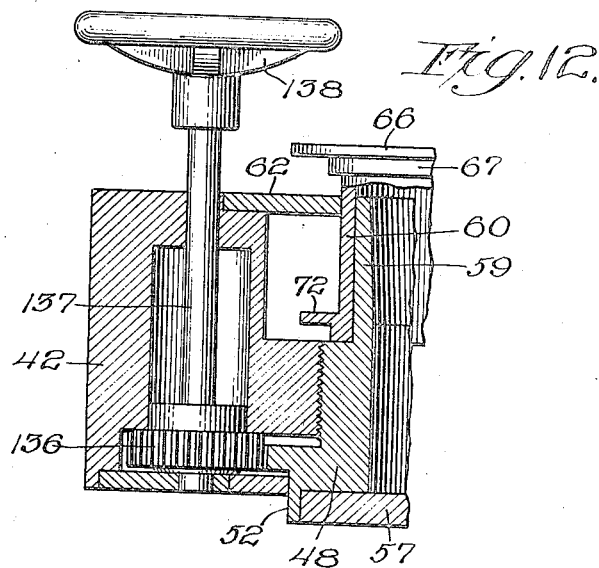

Figure 1 is a view in side elevation of a machine constructed in accordance with my invention. Figure 2 is an enlarged plan view of the die-blank-holding mechanism and the means whereby the desired relative movement of the die-blank and the milling device, is effected. Figure 3 is a view in end elevation of the mechanism shown in Fig. 2, the latter being viewed in the direction of the arrow in Fig. 2. Figure 4 is a view in elevation of the opposite end of the mechanism of Fig. 2. Figure 5 is a view in side elevation of the mechanism of Fig. 2, with a certain part of the housing broken away to disclose an interior detail, with the lowermost member shown in perspective. Figure 6 is a section taken at the line 6—6 on Fig. 2 and viewed in the direction of the arrow, with the lowermost member also shown in perspective. Figure 7 is a section taken at the irregular line 7—7 on Fig. 6 and viewed in the direction of the arrows. Figure 8 is a plan view, with one of the parts shown in section and parts broken away, of the mechanism at the right hand side of Fig. 5. Figure 9 is a section taken at the line 9—9 on Fig. 5 and viewed in the direction of the arrows. Figure 10 is a section taken at the irregular line 10—10 on Fig. 6 and viewed in the direction of the arrows. Figure 11 is a section taken at the lines 11—11 on Figs. 7 and 10 and viewed in the direction of the arrows. Figure 12 is a plan sectional view taken through the mechanism for returning the work-holder to normal position. Figure 13 is a section taken at the irregular line 13—13 on Fig. 9 and viewed in the direction of the arrows. Figure 14 is a plan view of a die-blank and the milling device, the die blank being shown in section, the section being taken at the line 14—14 on Fig. 15 and viewed in the direction of the arrow, this view illustrating the relative positions of the die-blank and milling device in the operation of threading one of the segments of the blank. Figure 15 is a view in elevation of the parts shown in Fig. 14 showing the die-blank by a face view and the milling device in end elevation. Figure 16 is a view, in the nature of a diagram and in side elevation, of the structure shown in Fig. 14. Figure 17 is a view, in the nature of a diagram, illustrating the action of the milling device on a die segment during the operation of cutting a thread thereon. Figure 18 is a diagrammatic view of one of the cutting members of the milling device showing it relative to the thread to be cut and which is shown enlarged; and Figure 19, a broken view in end elevation showing a modification of the mechanism for shifting the work-supporting parts for producing the "backing-off" of the die.

The particular construction of machine illustrated is designed for use in the producing of threads on die blanks of a type, commonly known, and formed of a rectangular-shaped body of steel, with an opening therethrough into which lug portions, which form the thread segments, when threaded, extend, such a blank being shown in Fig. 7 wherein it is represented at 25, the opening therein being shown at 26 and the lug portions referred to at 27, there being four of these lug portions, the inner surface of each of which is to be threaded to form the cutting portions of the die, though it will be understood from the following that the invention is not limited to its use in the manufacture of the particular form of die shown.

The milling device and work-holding device are mounted on a bed, the work-holding device preferably to be movable lengthwise of the milling device, such a bed, and which is common in lathe constructions, being indicated at 28, upon which a carriage forming a part of the work-holding device and represented at 29 and extending transversely of the bed, is mounted to slide lengthwise of the bed, the latter in practice being provided with means, such as for example those commonly used in lathes for shifting the tool-holder thereof, for moving the carriage 29 lengthwise of the bed and the milling device the spindle of which, represented at 30ª, is secured at one end in the rotating head-stock 30ᵇ to be rapidly rotated thereby, and journaled at its opposite end in a tail-stock (not shown), on the bed 28, the milling device extending through the work-holding device and its operating mechanism supported on the carriage 29 and hereinafter described.

Mounted on the carriage 29 to extend transversely of the bed 28, is a base member 32, there being provided between this member and the carriage 29, guiding means for causing the base member 32 to move in a predetermined path crosswise of the bed when adjusted thereon for the purpose hereinafter explained. The guide means shown comprise a dovetail rib 33 provided on the upper surface of the carriage 29 and extending into a dovetail channel 34 in the bottom of the base 32 longitudinally of the latter, the rib 33 being disposed at a right angle to the axis about which the milling device 31 carried by the spindle 30ª rotates, for a purpose hereinafter explained. The channel 34 also contains a gib 33ª cooperating with set screws 33ᵇ in the member 32 for rigidly holding the base 32 on the carriage in position of adjustment thereon, effected as by means of any suitable device, as for example that commonly used on the tool-holders of lathes for adjusting the tools toward and away from the work, and including a depending lug 34ª on the member 32 in which a screw-shaft (not shown) provided on the carriage 29, and equipped with a hand-wheel 34ᵇ, screws. The upper surface of the base 32 is provided with a dovetail rib 35 extending lengthwise thereof and crosswise of the bed at an angle slightly oblique to the axis about which the milling device 31 rotates, the rib 35 being located within a dovetail channel 36 provided in the bottom surface of a sub-base member 37 which also extends crosswise of the bed and is adapted to slide, guided by the rib 35, on the base 32. The sub-base 37 is provided adjacent its opposite ends, with upwardly-extending bosses 38 through which a shaft 39 extends, this shaft also extending through pairs of lugs 40 depending from the base 41 of a housing member 42, and through the medium of which shaft, the housing member 42 and the parts carried thereby, are pivotally connected with the sub-base 37 adapting the said housing with its several parts, to be tipped in a vertical plane. The edge portion of the base 41 opposite that equipped with the lugs 40 is provided with adjustable stop devices shown as screws 43 threaded in the base portion 41 and bearing at their lower ends against the upper surface of the sub-base 37, the adjustment thus provided permitting of the setting of the base portion 41 at any desired angle relative to the horizontal plane, the base portion 41 being also provided with screws 44 which extend downwardly therethrough and screw at their lower ends into threaded openings 45 in the sub-base 37 thereby co-operating with the adjusting screws 43 to firmly secure the base portion 41 in adjusted position. While the member 42 is shown as extending vertically, in use this last-referred-to member would be tipped to the right in Fig. 6 on the hinge 39 and set in such position by the screws 43 and 44, to extend at an oblique angle to the axis of the milling device, for a purpose hereinafter described.

The housing portion 42 is formed with an inwardly-extending annular flange 46 which is threaded at its inner periphery, as indicated at 47, to present a thread having the same pitch as that of the segmental threads to be formed on the die blank, the thread 47 constituting a lead screw for co-operation with that part of the structure on which the die blank is held, the parts described being preferably so proportioned and positioned, as shown, as to cause the axis of the milling cutter 30 to extend midway between the upper and lower portions of the bore in the housing member 42. Located within the housing 42 is a rotatable hollow member 48 of circular shape in cross section threaded between its ends, as indicated at 49, at which thread it screws into the thread 47. At one side of its threaded portion 49 the member 48 is equipped with a gear 50 which extends into a recess 51 in the housing 42, this end of the member 48 extending at a reduced portion 52 thereof, outwardly through the housing, the latter containing in a face thereof an annular recess 53 in which a removable ring 54 secured in place by screws 55, is located, this ring extending into overlapping position relative to the gear 50. The outer end of the member 48 is annularly recessed as indicated at 56 and contains a plate 57 secured to the member 48 as by means of the screws 58, the plate 57 constituting a part of the mechanism for holding in place the die-blank to be cut. The opposite end of the member 48, represented at 59, is surrounded by a tubular member 60 in which the member 48 may be rotated except when clutched thereto as hereinafter described. The tube member 60 extends through the opening 61 in a ring 62 mounted in an annular recess 63 in the end of the housing 42 opposite that containing the recess 53 and secured therein as by the screws 64, the outwardly extending end of the member 60 having secured thereon, as at the threaded connection 65, a ring 66 containing an annular recess 67 in its inner face. The member 60 constitutes one element of a clutch device through the medium of which the member 48 is rotated in the housing 42, the member 60 to this end containing in a face thereof, that which is disposed at the right hand side of Fig. 5, pairs of notches 68, preferably diametrically opposed, these notches co-operating with pairs of lugs 69 also diametrically opposed and carried by the member 48, these lugs being preferably formed on plates 70 which are set into the threaded periphery 49 of the member 48 to be inset relative to the threads thereon and held in place, as by screws 71. The member 60 is slidable lengthwise on the member 48 for moving the co-operating clutch elements into and out of interlocking position to connect together, or disconnect, the members 48 and 60 for driving the former from the latter, at will. The member 60 is provided with a flange 72 equipped with plungers 73 which guidingly extend into sockets 74 provided in a face of a worm wheel 75 surrounding the member 60 and splined thereon, to cause the member 60 and the worm wheel 75 to rotate together, the latter abutting the inner face of the ring 62. The plungers 73 have reduced portions 76, with shoulders 73$^a$ which extend lengthwise of the axis of the worm wheel 75 and guidingly extend into openings 77 in the wheel 75, the sockets 74 containing coiled springs 78 which surround the plungers 73 and by operating at their opposite ends against the bases of the sockets 74 and the shoulders 73$^a$ yieldingly force the member 60 to the right in Fig. 5 to a position in which the clutch device hereinbefore referred to clutches the members 48 and 60 together when the notches 68 and lugs 69 are in alinement.

Means are provided for controlling the throwing of said clutch in and out, these means, as shown, being formed of a lever 79 fulcrumed between its ends on a pin 80 supported in brackets 81 extending from the housing 42, the lower end of this lever being forked to provide the curved arms 82 which are equipped with inwardly-extending rollers 83 journaled thereon through the medium of the headed-pins 84, these rollers extending into the annularly recessed portions 67 of the ring 66 and bearing against the inner side of the latter as represented, it being understood that in the swinging of the lever 79 in clockwise direction in Figs. 4 and 5, the member 60 is shifted to the left in these figures to separate the members of the clutch device described.

The worm wheel 75 is driven through the medium of a worm 85 secured to a shaft 86 journaled in the housing 42 and shown as provided with a hand wheel 87 for rotating it. In this connection it may be stated that the machine as shown is adapted to be operated through the medium of the shaft 86, rotated by hand, but it will be readily understood that, if desired, it may be driven from a power device, and, where desirable, any suitable means for automatically arresting rotation of the shaft 86 thus driven and after a die has been threaded, may be provided.

Through the medium of the drive mechanism just referred to the member 48 which, as hereinbefore explained, supports the die blank to be operated on, is caused to be rotated in clockwise direction in Fig. 7 to cause it to make a practically complete revolution, the member 48 gradually moving inwardly, viz., to the left in Fig. 6, into the housing 42 by reason of its threaded connection therewith, the lengthwise travel of the member 48 being equal to the distance between any two adjacent portions of the thread 47. The work holder shown comprises the plate 57 provided on its outer face with a plurality of bosses 88 preferably disposed in retangular arrangement around the opening 89 in this plate and against which the blank 25 is adapted to bear at a face thereof. At one side of the opening 89 the plate 57 is provided with a laterally-extending lug 90 in the form of a bar equipped with bosses 91 spaced apart and against which the die blank bears at an edge thereof. The plate 57 is also provided with a laterally-extending portion 92 preferably disposed at right angles to the bar 90 and provided with a laterally-extending boss 93 against which the die blank bears at another edge thereof. The extension 92 is slotted as indicated at 94 to provide the three lugs 95, 96 and 97 through which a pivot pin 98 extends. Pivotally connected with the extension 92, through the medium of the pin 98, is a swinging plate 99 through the spaced lugs 100 on which the pin 98 extends, the inner face of the plate 99 being provided with bosses 101 preferably disposed in a rectangular arrangement thereon and in line with the lugs 88, respectively. The opposite end of the plate 99 contains a slot 102, the outer face of the plate at the portions thereof flanking this slot tapering in the direction as indicated at 103 (Fig. 8). This portion of the plate 99 co-operates with a clamping device shown as formed of a rod 104 pivoted at its inner end on a pivot pin 105 confined in ears 106 extending laterally from the plate 57. The rod 104 is formed with a head 107 at which the pivoting referred to is effected, the edge portion of this head which opposes the die blank 25, when the latter is introduced into the holder, being preferably in the form of a cam as represented at 108. The rod 104 extends through the slot 102 and is provided at its outer, threaded, end, with a nut 109 preferably having a curved inner end portion, as represented at 110, which bears against the tapered surfaces 103 of the plate 99. The plate 57 is also provided on its outer face, and diametrically opposed to the bar portion 90, with a pair of laterally-extending ears 111 containing a pivot pin 112 which extends through, and forms a pivot for, a rocking member 113, the free edge of which is preferably curved as represented at 114, the member 113 being outwardly pressed by a spring 113ª. The member 113 co-operates with an operating device therefor shown as formed of a rod 115 extending loosely through an opening 116 in the member 113 and engaging the outer face of this member at a shoulder 117 on the rod, this rod having threaded engagement at its inner end with an opening 118 in the plate 57. It may be here stated that in the positioning of the die-blank in the holder, the operator, assuming the actuating device formed of the rod 104 to be swung outwardly, introduces the die-blank 25 into a position wherein it rests upon the bosses 91 and against the boss 93. The operator then swings the plate 99 toward the die-blank and the operating member formed of the rod 104, into a position wherein the rod portion 104 extends into the slot 102 and the nut 109 opposes the tapered surface 103 of the plate 99. Upon tightening the nut 109 on the rod 104, the engagement of the nut with the tapered surface 103 operates to swing the rod 104 in counter-clockwise direction in Fig. 8 thereby causing the cam surface 108 to ride against the adjacent edge of the die-blank and force it rigidly up against the boss 93, the manipulation of the nut as stated also serving to firmly force the blank against the bosses 88. The operator then swings the member 113 toward the plate 57 and into engagement at its surface 114 with the adjacent edge of the die-blank 25, to exert a clamping force against this edge of the plate, by screwing the rod 115 into the plate 57, the construction of work holder described operating to very firmly hold the die-blank in position on the member 48.

In the particular construction of machine illustrated, the die-blank is caused, during the cutting of each segment 27, to be bodily shifted to the left in Figs. 7 and 15, thereby producing the "backing-off," or relieving, of the die at each of its segments, the die-blank being shifted in the opposite direction to cause the die-blank and the milling device, to occupy the necessary relative positions for cutting the next segment to "backed-off" condition, before the next segment has moved into engagement with the milling device, a description of the means shown for this purpose being as follows. The sub-base member 37 is provided with a depending lug 119 secured thereto as through the medium of the screws 120, this lug extending into a recess 121 located in the upper side of, and extending longitudinally of, the base member 32. The lug 119 is provided with bosses 122 spaced apart and extending into the ends of coil springs 123 which surround at their opposite ends, the ends of screw devices 124 which are adjustably mounted in a cross-piece 125 secured to an end of the base member 32 as by means of the screws 126, the screw devices 124 extending into, and lengthwise of, the recess 121 and being annularly flanged at their inner ends as represented at 127, the springs 123 being confined in compressed condition between the lug 119 and the flanged portions 127 and tending thereby to force the sub-base 37 and the parts carried thereby to the left in Fig. 9. The housing 42 has journaled therein a shaft 128 having rigid thereon a disk 129 the periphery of which is in the form of a cam, the high part of which is represented at 130, the shaft 128 being equipped with a pinion 131 meshing with the gear 50 through the medium of which latter the cam is rotated. The cam member 129 co-operates at its periphery with a roller 132 journaled on a shaft 133 mounted in a bracket 134 rigidly secured to the base member 32 as by the screws 135, it being understood from the foregoing that in the movement of the member 129 from the position in which the low part of the cam is in engagement with the roller 132, to a position in which the high part 130 of the cam engages this roller, the sub-base 37 and the parts carried thereby will be shifted to the right in Fig. 9 against the action of the springs 123, the proportions of the pinion 131 and the gear 50 being such that the cam member 129 will make four complete revolutions with each revolution of the gear 50, where the die blank to be operated on is provided with four segments to be threaded as in the case of the blank shown. Thus the sub-base 37 and the parts carried thereby will be caused to make four complete reciprocations with each complete rotation of the work holder, and the parts are so arranged that the high part 130 of the cam will contact with the roller 132 at a time when the milling device does not engage with any of the segments.

The gear 50 also meshes with a pinion 136 fixed on a shaft 137 journaled in the housing 46, this shaft being equipped with a hand wheel 138 for operating it, for the purpose hereinafter explained.

The gear 50 is provided at its opposite faces with projections 139 and 140 which may be afforded by providing the gear 54 with a pin extending therethrough and projecting at its ends beyond the opposite faces of the gear, the projection 140 being adapted to co-operate with a stop surface 141 on the face of the ring 54 opposing the gear 50; and the projection 139 being adapted to co-operate with a stop surface 142 provided on the housing 42 and extending into the recess 51. The stop surfaces 141 and 142 are provided for the purpose of limiting the rotation of the member 48, and consequently the work-holder, in both directions, the structure being designed to permit the member 48 to make practically one complete rotation only from initial, starting, position. In the starting position the projection 140 engages the stop surface 141 as shown in Fig. 8, and in the rotation of the gear 50, one revolution, during which operation the gear 50 and the parts connected therewith move to the left in Fig. 5 by reason of the rotation of the member 48 within the threads of the housing 46, the projection 139 engages the stop-surface 142.

The operation of the machine is as follows:

Assuming that the parts of the machine are in normal position and the work-holder is empty, the operator introduces the die blank to be operated on, as for example the die blank 25, into the holder to seat it upon the stop surfaces 91 and against the stop surface 93. The pivoted clamping plate 99 is then swung at its hinged connection with the member 48 toward and into contact with the outermost face of the die-blank, and the pivot rod 104 is then swung to a position in which it extends into the slot 102 in the plate 99. The nut 109 is then screwed upon the rod 104 and toward the plate 99, in which operation the nut is forced against the tapered surface 103 of said plate with the result of causing the rod 104 to swing to the right in Fig. 8 which not only forces the plate 99 into rigid clamping engagement with the die-blank 25 to thus firmly clamp it between this plate and the member 57, but also, by reason of the clamping action exerted by the cam member 107 on the rod 104 and engaging the adjacent edge of the die-blank, forcing the latter rigidly against the stop surface 93 thereby clamping the plate firmly in a lateral direction. The operator then, by manipulating the screw 115, wedges the member 113 against the upper edge of the die blank which firmly clamps the latter between the member 113 and the stop surfaces 91.

Assuming the milling device 30$^a$ to be rotating, the operator, to effect the thread-cutting operation, rotates the shaft 86 which in turn, through the medium of the worm 85, rotates the worm wheel 75 and, through the medium of the clutch mechanism described, rotation of the member 48 carrying the work is effected, the work rotating in clockwise direction in Figs. 3, 7 and 15, and the milling device being shown as rotating upon its axis in the opposite direction as indicated by the arrow in Fig. 15. It will be noted that in the normal position of the machine, as shown, the segment to be first threaded, viz., the lowermost one at the left hand side of Fig. 7, is below the plane of the cutting members of the milling device, and that the high part 130 of the cam 129 engages the periphery of the roller 132, and therefore the housing 42 and the parts carried thereby are shifted to substantially the limit of their movement to the right in Fig. 9. Before the work-holder has rotated to a position wherein the one of the segments last-referred-to moves into engagement with the milling device, the high part 130 of the cam will have passed beyond the periphery of the roller 133, and thus in the continued rotation of the shaft 86, the housing, 42, with the parts carried thereby slowly shifts to the left in Fig. 9. The shifting of the housing as stated continues throughout the time that the segment last-referred-to continues in engagement with the milling device, with the result of causing the thread cut on this segment, to recede from the center opening of the blank, thereby producing what is known as a relieved, or "backed-off," condition of the thread. At the conclusion of the cutting of the thread on the segment referred to, and before the next segment 27, by the continued rotation of the shaft 86, is moved into engagement with the milling device, the high portion 130 of the cam will have passed out of engagement with the periphery of the roller 132 and the work-holder will thus become repositioned for causing the segment last-referred-to to be operated on by the milling device in the continued operation of the machine, as explained of the segment first-referred-to, the cam 129 making four complete revolutions for each revolution of the work-holder.

Upon the conclusion of the cutting of this last-referred-to segment the housing 42 again shifts to the right while the next, third, segment is being carried into a position to be operated on by the milling device, this third segment being cut as explained of the first segment, and following the shifting of the housing 42 to the right for the fourth time and partial rotation of the member 48, the fourth segment is cut. At the conclusion of the cutting of this fourth segment the member 46 will have completed practically a complete revolution and in doing so further rotation thereof is arrested by the engagement of the stop 139 with the stop surface 142. Inasmuch as the member 48 engages at its thread 49 with the threaded portion 47 of the housing 42, which thread is of the same pitch as the thread to be cut on the die, the member 48 will move lengthwise in a single rotation, a distance equal to the pitch of the thread 47, and in adjusting the base 41 on the sub-base 37 at the hinging-shaft 39, before the cutting operation begins, to cause the die-blank to extend at an angle to the axis of the milling device corresponding with the angle of the lead of the thread desired to be formed on the segments of the blank, extends, such threads are caused to be accurately formed.

From the foregoing it will be understood that the four segments of the die-blank are cut, to thread the same, in succession, and that each is in "backed-off" or relieved, condition.

The mechanism is so constructed and arranged that the milling device operates to cut the segments in a direction toward what becomes, in the finished die, the cutting edges thereof or, in other words, from the back toward the front, or cutting edge, of the segment, as will be clear from the drawings, (see Fig. 17) this being of advantage as the cutter elements of the milling device during the cutting of those portions of the segments at which the cutting edges of the threads extend in the finished die, cut against a lesser body of metal than they would if the reverse operation occurred, thereby causing the finished threads to present clean cutting edges.

In the particular construction illustrated provision is made for causing the threaded opening in the die to taper from its front face, viz, the face of the die at the right hand side of Fig. 16 and at which the die in use is applied to the article on which the thread is to be cut, toward its rear face, viz, the portion of the die which is the last to operate on the article to be threaded by the die, and this is accomplished in the particular illustrated embodiment shown by disposing the guide rib 35 obliquely relative to the axis about which the milling device rotates, as shown more particularly in Fig. 14.

Inasmuch as the work inclines relative to the milling device to produce the tapered threaded opening in the die, it is desirable to provide the cutter elements on the milling device, of such form that instead of the converging cutting edges of the cutter elements extending at equal angles to the axis of the cutter they shall extend at slightly different angles thereto to compensate for the obliqueness of the angle between the face of the work and the axis of the milling device, and cut a thread the converging edges of which shall extend at the same angle to the axis of the finished die.

After a die blank has been threaded, as described, the operator to return the member 48 to normal position in the housing 42, throws the lever 79 into a position in which the co-operating clutch elements 68 and 69 are out of mesh, thereby permitting the member 48 to be turned at its threaded connection with the housing 42 throughout practically a complete revolution to normal condition, in which the member 48 moves to the right in Fig. 6, by rotating the hand wheel 138.

It will be understood from the drawings and from the foregoing description that the machine is adapted by reason of the adjustments provided therein, for use in the forming of dies the internal diameters of which vary.

It will be understood that in the cutting of threads on dies of different internal diameters, the angle at which the work is caused to extend relative to the axis of the milling device, determined by its adjustment on the hinge-pin 39, should be varied to cause this angle to correspond with the angle of the lead of the thread to be produced.

Referring now to the modification shown in Fig. 19, and which relates to the mechanism for shifting the sub-base 37 and the parts carried thereby to effect the "backed-off" condition of the threads of the segments, the mechanism of this figure, instead of employing the spring-means 123 as explained of the construction of the previous figures, employs a cam device 200 co-operating with a roller 201 on a bracket 202 on the sub-base 37. The cam 200 is carried on a shaft 203 rotatably mounted on the base 41 and equipped with a gear (not shown) meshing with the gear 50. The cam 200 and roller 201 co-operate with the cam disc 129 and roller 132, these cams being so constructed, and arranged, as shown, that they will be in engagement with their co-operating rollers at all times and will serve to positively shift the sub-base 37 in opposite directions, to produce the "backing-off" of each segment in the cutting of the threads thereon.

While I have illustrated and described certain particular constructions embodying my invention, I do not wish to be understood as intending to limit it thereto, as the same may be variously modified and altered without departing from the spirit of my invention.

What I claim as new and desire to secure by Letters Patent is:

1. In a machine of the character set forth, the combination of means for supporting an apertured die blank, the aperture in which is to be threaded, and a suitably-supported milling device of non-tapered form, said milling device and said means being relatively movable lengthwise of the axis of said device for threading the blank in said holder and said means being so constructed and arranged relative to the said milling device as to cause the die blank to extend at an angle oblique to the axis of said milling device for causing the threaded internal surface of the die to be of tapered form, said means being so constructed and arranged relative to said milling device, as to cause the die blank to extend in another direction at an angle to the axis of said milling device corresponding to the angle of the lead of the screw thread to be produced on the blank.

2. In a machine of the character set forth, the combination of means for supporting an apertured die blank, the aperture in which is to be threaded, a suitably-supported milling device of non-tapered form and lead-screw means by means of which said milling device and said first-named means are relatively movable lengthwise of the axis of said milling device, for threading the blank in said first-named means, said first-named means being so constructed and arranged relative to the said milling device as to cause the die blank to extend at an angle oblique to the axis of said milling device for causing the threaded internal surface of the die to be of tapered form, and said means being so constructed and arranged, relative to said milling device, as to cause the die blank to extend in another direction at an angle to the axis of said milling device corresponding to the angle of the lead of the thread to be produced on the blank.

3. In a machine of the character set forth, the combination of means for supporting an apertured die blank, the aperture in which is to be threaded, a suitably-supported milling device of non-tapered form, means for producing relative movement of said milling device and said first-named means crosswise of said milling device, and means for causing relative movement of said milling device and said first-named means lengthwise of the axis of said milling device, said first-named means being so constructed and arranged relative to the said milling device as to cause the die blank to extend at an angle oblique to the axis of said milling device for causing the threaded internal surface of the die to be of tapered form, said first-named means being so constructed and arranged, relative to said milling device, as to cause the die blank to extend in another direction at an angle to the axis of said milling device corresponding to the angle of the lead of the thread to be produced.

4. In a machine of the character set forth, the combination of means for supporting an object to be threaded, and a suitably-supported milling device of non-tapered form, said milling device and said means being relatively movable lengthwise of the axis of said device for threading the blank in said holder and said means being so constructed and arranged relative to the said milling device as to cause the object to extend at an angle oblique to the axis of said milling device for causing the threaded surface of the object to be of tapered form, said means being so constructed and arranged relative to said milling device, as to cause the object to extend in another direction at an angle to the axis of said milling device corresponding to the angle of the lead of the screw thread to be produced on the object.

5. In a machine of the character set forth, the combination of means for supporting an object to be threaded, a suitably-supported milling device of non-tapered form, and lead-screw means by which said milling device and said first-named means are relatively movable lengthwise of the axis of said milling device for threading the object in said first-named means, said first-named means being so constructed and arranged relative to the said milling device as to cause the object to extend at an angle oblique to the axis of said milling device for causing the threaded surface of the object to be of tapered form, and said means being so constructed and arranged, relative to said milling device, as to cause the object to extend in another direction at an angle to the axis of said milling device corresponding to the angle of the lead of the thread to be produced on the object.

6. In a machine of the character set forth, the combination of a suitably-supported milling device, a bed, and a die-blank-supporting member mounted on said bed and adapted to be adjusted on a substantially horizontal axis, in a plane lengthwise of the axis of said milling device, said member extending in another direction obliquely to the axis of said milling device, whereby the threaded surface of the die-blank is caused to be of tapered form, and the angle at which the blank extends relative to the milling device may be caused to correspond with the angle of the lead of the thread to be produced on the blank.

7. A work holder comprising a base member, a stop surface thereon for engagement with the edge of the work, a second member on said base member and adapted to be moved toward said base member and against the face of the work for clamping the latter between said base member and said second member, and means for moving said second member into clamping engagement with the work and forcing the work against said stop-surface.

8. A work holder comprising a base member, a stop surface thereon for engagement with the edge of the work, a second member on said base member and adapted to be moved toward said base member and against the face of the work for clamping the latter between said base member and said second member, and means for moving said second member into clamping engagement with the work and simultaneously forcing the work against said stop-surface.

9. A work holder comprising a base member, a stop surface thereon for engagement with the edge of the work, a second member on said base member and adapted to be moved toward said base member and against the face of the work for clamping the latter between said base member and said second member, a pivotally-supported device co-operating with said second member and operating when actuated, to move the latter into clamping engagement with the work, and means operated by said device for engaging the edge of the work opposite that engaged by said stop-surface and forcing the work into engagement with said stop-surface.

10. A work holder comprising a base member, a stop surface thereon for engagement with the edge of the work, a second member on said base member and adapted to be moved toward said base member and against the face of the work for clamping the latter between said base member and said second member, a pivotally-supported member, means including a wedge surface, co-operating with said pivotally-supported member and with said second member operating, when actuated to force said second member into clamping engagement with the work and in such movement swinging said pivotally supported member, and means actuated by said pivotally-supported member, in its swinging movement, for forcing the work against said stop-surface.

11. A work holder comprising a base member, a stop surface thereon for engagement with the edge of the work, a second member on said base member and adapted to be moved toward said base member and against the face of the work for clamping the latter betwen said base member and said second member, a pivotally-supported member, said second member presenting a wedge surface, and means on said pivotally-supported member operating, when actuated, to move against said wedge surface and force said second member into clamping engagement with the work and in such movement swing said pivotally-supported member, and means actuated by said pivotally-supported member, in its swinging movement, for forcing the work against said stop surface.

12. A work holder comprising a base member, a stop surface thereon for engagement with the edge of the work, a second member on said base member and adapted to be moved toward said base member and against the face of the work for clamping the latter between said base member and said second member, a pivotally-supported device co-operating with said second member and operating, when actuated, to move the latter into clamping engagement with the work, and cam means operated by said device for engaging the edge of the work opposite that engaged by said stop-surface and forcing the work into engagement with said stop-surface.

13. A work holder comprising a base member, a stop surface thereon for engagement with the edge of the work, a second member on said base member and adapted to be moved toward said base member and against the face of the work for clamping the latter between said base member and said second member, a pivotally-supported device co-operating with said second member and operating, when actuated, to move the latter into clamping engagement with the work, and a cam on said device for the purpose set forth.

14. A work holder comprising a base member, a stop-surface thereon for engagement with an edge of the work, a second member on said base member and adapted to be moved toward said base member and against the face of the work for clamping the latter between said base member and said second member, a pivotally-supported member, means, including a wedge surface, co-operating with said pivotally-supported member and with said second member operating, when actuated, to force said second member into clamping engagement with the work and in such movement swinging said pivotally-supported member, and cam means actuated by said pivotally-supported member in its swinging movement, for forcing the work against said stop surface.

15. A work holder comprising a base member, a stop surface thereon for engagement with the edge of the work, a second member on said base member and adapted to be moved toward said base member and against the face of the work for clamping the latter between said base member and said second member, a pivotally-supported member, said second member presenting a wedge surface, and means on said pivotally-supported member operating, when actuated, to move against said wedge surface and force said second member into clamping engagement with the work and in such movement swinging said pivotally-supported member, and cam means actuated by said pivotally-supported member, in its swinging movement, for forcing the work against said stop surface.

16. A work holder comprising a base member, a stop surface thereon for engagement with the edge of the work, a second member on said base member and adapted to be moved toward said base member and against the face of the work for clamping the latter between said base member and said second member, said second member having a wedge surface, a third member pivotally-supported on said base member and having its outer end threaded, a nut screwing upon the threaded end of said third member and bearing against said wedge surface for forcing said second member into clamping engagement with the work and in such movement cause the said third member to swing on its pivot, and a cam on said third member engaging the edge of the work opposite that engaged by said stop surface and operating in the swinging movement of said third member to force the work against said stop surface.

17. In a machine of the character set forth, the combination of a milling device, and a die-blank-supporting member, said device and member being relatively movable lengthwise of the axis of said device and relatively rotatable for producing a thread on the die-blank, said member supporting the die-blank to extend obliquely to the axis of said milling device in a plurality of directions, whereby the threaded surface of the die-blank is caused to be of tapered form and the angle at which the blank extends relative to the milling device may be caused to correspond with the angle of the lead of the thread to be produced on the blank.

18. In a machine of the character set forth, the combination of a milling device, a die-blank-supporting member, said device and member being relatively movable lengthwise of the axis of said device and relatively rotatable for producing a thread on the die-blank, said member supporting the die-blank to extend obliquely to the axis of said milling device in a plurality of directions, whereby the threaded surface of the die-blank is caused to be of tapered form and the angle at which the blank extends relative to the milling device may be caused to correspond with the angle of the lead of the thread to be produced on the blank, and means for producing relative movement of said device and member in a direction lengthwise of the axis of said milling device.

19. In a machine of the character set forth, the combination of a milling device, a die-blank-supporting member, said device and member being relatively movable lengthwise of the axis of said device and relatively rotatable for producing a thread on the die-blank, said member supporting the die-blank to extend obliquely to the axis of said milling device in a plurality of directions, whereby the threaded surface of the die-blank is caused to be of tapered form and the angle at which the blank extends relative to the milling device may be caused to correspond with the angle of the lead of the thread to be produced on the blank, and lead-screw means for producing relative movement of said device and member in a direction lengthwise of the axis of said milling device.

20. In a machine of the character set forth, the combination of a suitably supported milling device, a bed, and a die-blank-supporting member mounted on said bed and supporting the die-blank to extend obliquely to the axis of said milling device in a plurality of directions, whereby the threaded surface of the die-blank is caused to be of tapered form and the angle at which the blank extends relative to the milling device may be caused to correspond with the angle of the lead of the thread to be produced on the blank.

21. In a machine of the character set forth, the combination of a suitably supported milling device, a bed, and a die-blank-supporting member mounted on said bed and supporting the die-blank to extend obliquely to the axis of said milling device, in a plurality of directions, whereby the threaded surface of the die-blank is caused to be of tapered form and the angle at which the blank extends relative to the milling device may be caused to correspond with the angle of the lead of the thread to be produced on the blank, and means for producing relative movement of said device and member in a direction lengthwise of the axis of said device.

22. In a machine of the character set forth, the combination of a suitably supported milling device, a bed, and a die-blank-supporting member mounted on said bed and supporting the die-blank to extend obliquely to the axis of said milling device, in a plurality of directions, whereby the threaded surface of the die-blank is caused to be of tapered form and the angle at which the blank extends relative to the milling device may be caused to correspond with the angle of the lead of the thread to be produced on the blank, and lead-screw means for producing relative movement of said device and member in a direction lengthwise of the axis of said milling device.

23. In a machine of the character set forth, the combination of a rotatably supported milling device, a bed, a die-blank-supporting member mounted on said bed to be movable thereon in a direction lengthwise of the axis of said milling device, said member supporting the die-blank to extend obliquely to the axis of said milling device in a plurality of directions, whereby the threaded surface of the die-blank is caused to be of tapered form and the angle at which the blank extends relative to the milling device may be caused to correspond with the angle of the lead of the thread to be produced on the blank, means for rotating said member, and lead-screw means operatively engaging said member for moving the latter in a direction lengthwise of the axis of said device.

24. In a machine of the character set forth, the combination of a rotatably supported milling device, a bed, a die-blank-supporting member mounted on said bed to be movable thereon in a direction lengthwise of the axis of said milling device, said member supporting the die-blank to extend obliquely to the axis of said milling device in a plurality of directions, whereby the threaded surface of the die-blank is caused to be of tapered form and the angle at which the blank extends relative to the milling device may be caused to correspond with the angle of the lead of the thread to be produced on the blank, means for rotating said member, lead-screw means operatively engaging said member for moving the latter in a direction lengthwise of the axis of said device, and means for effecting the relieving of the threads produced on the die-blank.

25. In a machine of the character set forth, the combination of means for supporting an apertured die-blank, the aperture in which is to be threaded, a suitably supported milling device of non-tapered form, said milling device and said means being relatively movable lengthwise of the axis of said device for threading the blank in said holder, said means supporting said blank in a position in which it extends at an angle oblique to the axis of said milling device for causing the threaded internal surface of the die to be in tapered form, and means for effecting the relieving of the threads produced on the die.

26. In a machine of the character set forth, the combination of means for supporting an apertured die-blank, the aperture in which is to be threaded, a suitably supported milling device of non-tapered form, said milling device and said means being relatively movable lengthwise of the axis of said device for threading the blank in said holder, said means being so constructed and arranged relative to said milling device as to cause the die to extend at an angle oblique to the axis of said milling device for causing the threaded internal surface of the die to be of tapered form, and means for effecting the relieving of the threads produced on the die.

27. In a machine of the character set forth, the combination of means for supporting an apertured die-blank, the aperture in which is to be threaded, a suitably supported milling device of non-tapered form, said milling device and said means being relatively movable lengthwise of the axis of said device for threading the blank in said holder, means for producing said relative movement of said milling device and said first-named means, said first-named means supporting said blank in a position in which it extends at an angle oblique to the axis of said milling device for causing the threaded internal surface of the die to be of tapered form, and means for effecting the relieving of the threads produced on the die.

28. In a machine of the character set forth, the combination of means for supporting an apertured die-blank, the aperture in which is to be threaded, a suitably supported milling device of non-tapered form, said milling device and said means being relatively movable lengthwise of the axis of said device for threading the blank in said holder, lead-screw means for producing said relative movement of said milling device and said first-named means, said first-named means supporting said blank in a position in which it extends at an angle oblique to the axis of said milling device for causing the threaded internal surface of the die to be of tapered form, and means for effecting the relieving of the threads produced on the die.

29. In a machine of the character set forth, the combination of means for supporting an apertured die-blank, the aperture in which is to be threaded, a suitably supported milling device of non-tapered form, means for producing relative movement of said milling device and said first-named means toward each other, and means for causing relative movement of said milling device and said first-named means lengthwise of the axis of said milling device, said first-named means supporting said blank in a position in which it extends at an angle oblique to the axis of said milling device for causing the threaded internal surface of the die to be of tapered form.

30. In a machine of the character set forth, the combination of means for supporting an apertured die-blank, the aperture in which is to be threaded, a suitably supported milling device of non-tapered form, means for producing relative movement of said milling device and said first-named means toward and away from each other, and means for causing relative movement of said milling device and said first-named means lengthwise of the axis of said milling device, said first-named means being so constructed and arranged relative to said milling device as to cause said blank to be supported in a position in which it extends at an angle oblique to the axis of said milling device for causing the threaded internal surface of the die to be of tapered form.

31. In a machine of the character set forth, the combination of means for supporting an apertured die-blank, the aperture in which is to be threaded, a suitably supported milling device of non-tapered form, means for producing relative movement of said milling device and said first-named means, and a lead-screw for causing relative movement of said milling device and said first-named means lengthwise of the axis of said milling device, said first-named means being so constructed and arranged relative to said milling device as to cause said blank to be supported in a position in which it extends at an angle oblique to the axis of said milling device for causing the threaded internal surface of the die to be of tapered form.

32. In a machine of the character set forth, the combination of a rotatable holder for the apertured die-blank, the aperture in which is to be threaded, a suitably supported milling device of non-tapered form, said milling device and said holder being relatively movable lengthwise of the axis of said device for threading the blank in said holder, said holder being so constructed and arranged as to cause the die-blank, at the portion thereof, to be threaded in the movement of the die-blank in the rotation of said holder into a position to be operated on by said device, to extend at an angle oblique to the axis of said milling device for causing the threaded internal surface of the die to be of tapered form and means for effecting the relieving of the threads produced on the die.

33. In a machine of the character set forth, the combination of a suitably supported milling device, a supporting member, and a die-blank-supporting member mounted on said support and adapted to be adjusted to extend into different angular positions oblique to the axis of said device for causing said holder to extend at an angle to said axis corresponding with the angle of the lead of the thread to be produced on the blank, said holder extending at an angle oblique to said axis in another direction for causing the threaded opening to be of tapered form.

34. In a machine of the character set forth, the combination of a suitably supported milling device, a die-blank holder, said device and holder being relatively movable in a direction lengthwise of the axis of said device, lead-screw means for effecting said relative movement, the axis of said means being inclined relative to the axis of said milling device, and means for effecting the relieving of the threads produced on the die.

OTTAR S. LEE.